Patented Jan. 13, 1942

2,269,885

UNITED STATES PATENT OFFICE 2,269,885

MANUFACTURE OF AZO PIGMENTS

Harry James Twitchett, Blackley, Manchester, England, assignor to Imperial Chemical Industries Limited, a corporation of Great Britain No Drawing. Application October 24, 1940, Serial No. 362,687. In Great Britain November 3, 1939

5 Claims. (Cl. 260—193)

This invention relates to a process for manufacturing new azo pigments.

According to the present invention new azo pigments are made by coupling diazotised 3-nitro-4-aminotoluene with acetoacetanilide under such conditions that the coupling product of diazotised 3-nitro-4-aminotoluene and acetoacet-p-chloroanilide is present in the coupling medium in proportions as defined below, either during the said coupling or immediately thereafter.

That is to say that the invention may be carried out either by adding the coupling product of diazotised 3-nitro-4-aminotoluene and acetoacet-p-chloroanilide to, or causing it to be formed in, the coupling medium, at once or by stages, before, during or immediately after coupling, or by employing variations of such methods in accordance with the above statement. Thus the presence of the coupling product of 3-nitro-4-aminotoluene and acetoacet-p-chloroanilide may conveniently be brought about by causing diazotised 3-nitro-4-aminotoluene to couple with a mixture of acetoacetanilide and acetoacet-p-chloroanilide.

By working according to the present invention pigments are produced which are of similar shade to the pigment made from diazotised 3-nitro-4-aminotoluene and acetoacetanilide by itself, but possess greater tinctorial strength. This effect is new and could not be predicted and is not obtainable by mechanically mixing in the same proportions the two azo compounds made separately. The proportion of the coupling product of 3-nitro-4-aminotoluene and acetoacet-p-chloroanilide to be used according to the present invention corresponds to a molecular proportion of acetoacet-p-chloroanilide of from 5% to 40% of the total amount of the two arylides used. If the acetoacet-p-chloroanilide represents more than 40% of the total amount of the two arylides an undesirable change in shade is caused.

This invention is illustrated, but not limited, by the following examples, in which the parts are by weight.

Example 1

152 parts of 3-nitro-4-aminotoluene are stirred in 2000 parts of water and 86 parts of hydrochloric acid (calculated as 100%). The mixture is cooled with ice to 3° C. and diazotisation effected by adding 69 parts of sodium nitrite. The diazo solution is then separated from suspended solids by filtration and added slowly to a suspension obtained by dissolving 159 parts of acetoacetanilide and 21.2 parts of acetoacet-p-chloroanilide in 14,000 parts of water at 10–12° C. containing 41 parts of sodium hydroxide and adding 160 parts of 40% acetic acid and 116 parts of sodium acetate crystals. After addition of all the diazo solution, stirring is continued for 15 minutes. The precipitate is then filtered off, washed until the filtrate is neutral to blue litmus, and dried. A yellow pigment is obtained of very good tinctorial strength and good fastness properties.

Example 2

90% of a solution of diazotised 3-nitro-4-aminotoluene prepared as in Example 1 is added slowly to a suspension obtained by dissolving 159 parts of acetoacetanilide in 12,000 parts of water at 10–12° C. containing 36.9 parts of sodium hydroxide and adding 144 parts of 40% acetic acid, and 105 parts of sodium acetate crystals. To the reaction product there is added a suspension obtained by dissolving 21.2 parts of acetoacet-p-chloroanilide in 2000 parts of water at 10–12° C. containing 4.1 parts of sodium hydroxide and adding 16 parts of 40% acetic acid and 12 parts of sodium acetate crystals. The remaining 10% of diazo solution is then added slowly. The resulting yellow pigment is filtered off, washed and dried as in Example 1. It possesses excellent tinctorial strength and good fastness properties.

Example 3

The suspensions of acetoacetanilide and acetoacet-p-chloroanilide prepared as described in Example 2 are coupled separately and simultaneously with 90% and 10% respectively of the solution of diazotised 3-nitro-4-aminotoluene prepared as described in Example 1. The pigment suspensions are immediately mixed, stirred for one hour, and the combined precipitate filtered off, washed and dried as in Example 1. A yellow pigment having similar properties to the product of Example 1 is obtained.

Example 4

10% of the solution of diazotised 3-nitro-4-aminotoluene prepared as described in Example 1 is added slowly to a suspension of acetoacet-p-chloroanilide prepared as described in Example 2. To the reaction product there is then added a suspension of acetoacetanilide prepared as described in Example 2, followed slowly by the remaining 90% of diazo solution. The resulting precipitate is filtered off, washed and dried as in Example 1. There is thus obtained a yellow pigment of similar properties to the product of Example 1.

I claim:

1. An azo composition produced by coupling diazotized 3-nitro-4-amino-toluene with acetoacetanilide and aceto acet-p-chloro-anilide wherein the molecular proportion of coupled acetoacetanilide to coupled acetoacet-p-chloro-anilide is about 0.9 to 0.1, said composition being about the shade of the azo compound m-nitro-p-toluidine→acetoacetanilide but having greater tinctorial strength.

2. The process of manufacturing a conjointly coupled azo composition comprising the coupling of diazotized 3-nitro-4-amino-toluene with acetoacetanilide and acetoacet-p-chloro-anilide, the step which comprises completing the coupling in a mixture containing the freshly coupled compound 3-nitro-4-amino-toluene→acetoacetanilide and a sufficient excess of the diazo component to form a coupled product in which the molecular proportion of combined coupling component to diazo component is about 1 to 1, the molecular proportion of acetoacetanilide to acetoacet-p-chloro-anilide being about 0.9 to 0.1.

3. The process in accordance with claim 2 in which the coupling is effected by mixing diazotized 3-nitro-4-amino-toluene in a coupling medium with the combined coupling components.

4. The process in accordance with claim 2 in which a suspension of all of one of the coupling components is mixed in a coupling medium with that portion of the diazo which bears the proportion to all the diazo that said coupling component bears to all of the coupling component, then mixing a suspension of the other component with said mixture, finally adding the remainder of the diazo and then agitating until coupling is completed.

5. The process in accordance with claim 2 in which 90% of the diazo component is mixed with a coupling medium containing a suspension of the acetoacetanilide and at the same time 10% of the diazo component is mixed with another coupling medium containing a suspension of the acetoacet-p-chloro-anilide, and then the resulting mixtures are combined and agitated until coupling is completed.

HARRY JAMES TWITCHETT.